(12) United States Patent
Lo

(10) Patent No.: US 6,359,943 B1
(45) Date of Patent: Mar. 19, 2002

(54) ASYNCHRONOUS DATA RECEIVING CIRCUIT AND METHOD

(75) Inventor: Wei-Chi Lo, San Jose, CA (US)

(73) Assignee: Integrated Memory Logic, Inc., Santa Clara, CA (US)

( * ) Notice: Subject to any disclaimer, the term of this patent is extended or adjusted under 35 U.S.C. 154(b) by 0 days.

(21) Appl. No.: 09/460,538

(22) Filed: Dec. 13, 1999

Related U.S. Application Data

(62) Division of application No. 08/864,629, filed on May 28, 1997, now Pat. No. 6,134,285.

(51) Int. Cl.⁷ .................................................. H04L 7/04
(52) U.S. Cl. ..................... 375/340; 375/360; 375/368
(58) Field of Search ................................. 375/340, 354, 375/355, 359, 360, 362, 368; 370/506; 713/400

(56) References Cited

U.S. PATENT DOCUMENTS

| | | | | |
|---|---|---|---|---|
| 4,298,956 A | * | 11/1981 | Rathbun et al. | 364/900 |
| 5,646,966 A | | 7/1997 | Chaki et al. | 375/368 |
| 5,787,132 A | | 7/1998 | Kishigami et al. | 375/354 |

\* cited by examiner

*Primary Examiner*—Amanda T. Le
(74) *Attorney, Agent, or Firm*—Skjerven Morril MacPherson LLP; Philip W. Woo

(57) ABSTRACT

In accordance with this invention, a data capture circuit of a data receiver captures data from a data stream of a data transmitter operating at a different phase or frequency from the system clock of the data receiver. In one embodiment, the data receiver determines the number of clock periods of a clock signal in a data period of the data stream. Specifically, a signal detection circuit receives a signal having a periodic and distinctive feature. The period of the periodic and distinctive feature is related to the data period by a fixed scaling factor. A counter counts the number of clock periods of the clock signal between a first occurrence of the periodic and distinctive feature and a second occurrence of the periodic and distinctive feature. A multiplier/divider circuit divides or multiples the content of the first counter by the scaling factor to determine the integer clock period count. The results of the multiply or divide is stored in a count register. In some embodiments of the data receiver an integer error compensation circuit compensates for the difference between the actual number of clock periods in a data period and the integer clock period count. A divider divides the integer clock period count to calculate an integer N and causes a data register to capture a data word on the N-th occurrence of an active edge of the clock signal after the beginning of the data word.

16 Claims, 6 Drawing Sheets

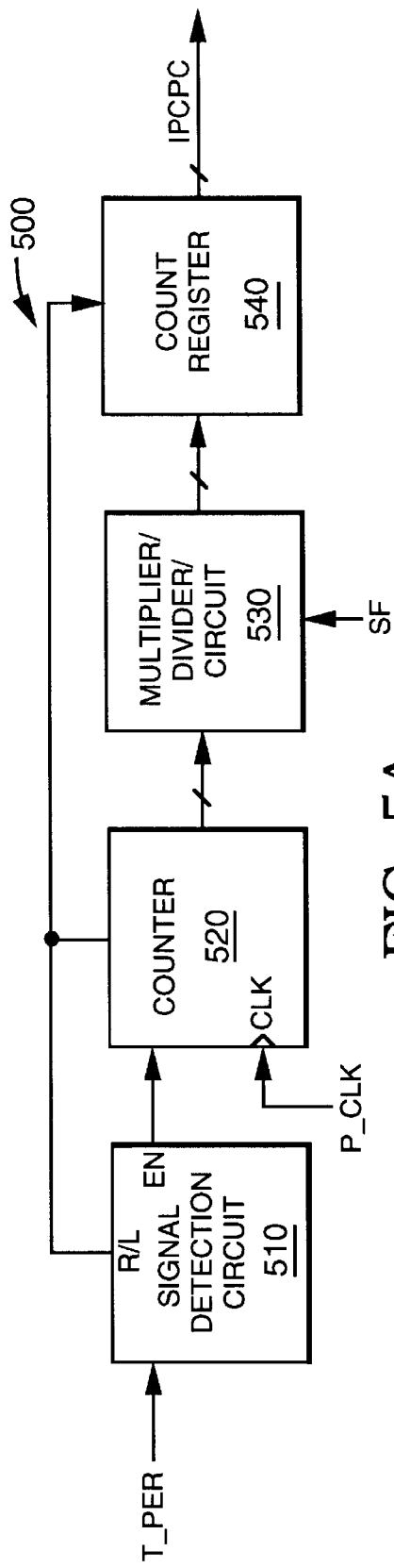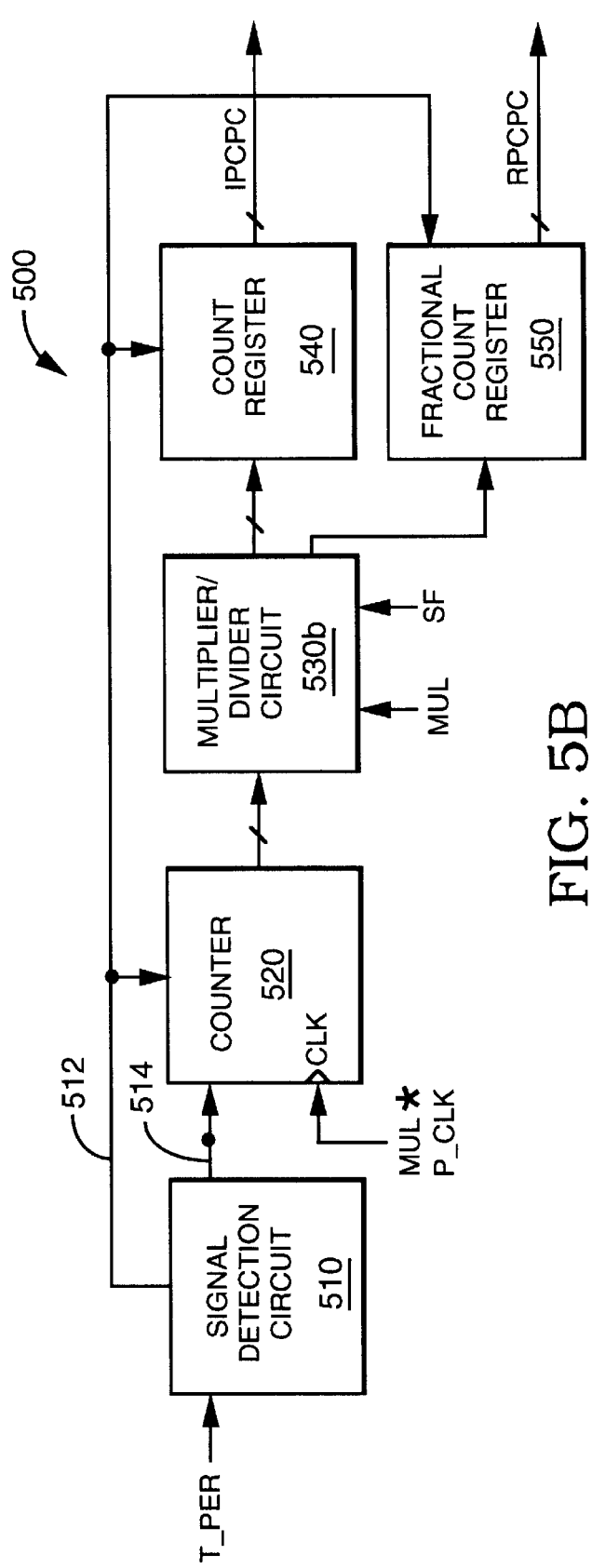

ASYNCHRONOUS DATA RECEIVING CIRCUIT AND METHOD

CROSS-REFERENCE TO RELATED APPLICATION

This is a divisional of U.S. application Ser. No. 08/864,629, filed May 28, 1997, now U.S. Pat. No. 6,134,285 entitled "Asynchronous Data Receiving Circuit and Method," by Wei-Chi Lo.

REFERENCE TO APPENDIX A

Appendix A, which is a part of the present disclosure, is a listing of Verilog code for an embodiment of this invention, which is described more completely below.

A portion of the disclosure of this patent document including Appendix A, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

This invention relates generally to data receivers and in particular to a data receiver for communications between devices running at different clock frequencies or clock phases.

2. Description of the Related Art

In a digital electronic system, devices within the system must communicate with other devices. FIG. 1 shows a simple digital system containing a data transmitter 110 and a data receiver 120. Data transmitter 110 sends digital data in a data stream D to data receiver 120 over data lines 130. In some systems, data transmitter 110 and data receiver 120 exchange control signals over control lines 140. Data transmitter 110 and data receiver 120 can be for example, different parts of a single VLSI IC, two IC's in a system, a storage device and a computer system, two independent systems, or a digital signal processor of a CD-ROM and a CD-ROM controller chip.

If data transmitter 110 and data receiver 120 are clocked at the same phase and frequency, the transmission of data between data transmitter 110 and data receiver 120 is straight forward. However, in situations where data transmitter 110 and data receiver 120 are clocked at different phases or frequencies, data receiver 120 must capture data stream D off of data lines 130 and synchronize data stream D to the phase and frequency of data receiver 120.

A conventional solution to capture data stream D from data line 130 to the phase and frequency of data receiver 120 is to use a dual ported FIFO (not shown) in data receiver 120. One port of the dual ported FIFO is clocked by data transmitter 110 to store the data stream from data lines 130. The other port of the dual ported FIFO is clocked by data receiver when data is read from the dual ported FIFO. However this solution requires a potentially expensive memory structure to be added to data receiver 120. Furthermore, a clock signal or data write signal synchronized with data stream D from data transmitter 110 must accompany the data. Therefore, in situations where data transmitter 110 does not provide a synchronized write or clock signal to data receiver 120, the conventional solution of using a dual ported FIFO is not feasible.

Hence there is a need for a method or apparatus to capture data from data transmitter 110 for use with data receiver 120, when data transmitter 110 and data receiver 120 are clocked at different phases or frequencies. Furthermore, the method or apparatus should be able to capture the data even if data transmitter 110 does not provide a clock or write signal to data receiver 120.

SUMMARY OF THE INVENTION

In accordance with this invention, a data capture circuit in a data receiver captures incoming data from a data stream at a different phase or frequency to the system clock of the data receiver. Each data word of the data stream is transmitted for a length of time called a data period. A data circuit in accordance with a first embodiment of the invention includes a signal detection circuit to detect a periodic and distinctive feature of a signal. The period between the periodic and distinctive feature of the signal is related to the data period by a scaling factor. A counter counts the number of clock periods between a first occurrence of the periodic and distinctive feature and a second occurrence of the periodic and distinctive feature. A multiplier/divider circuit multiples or divides the contents of the counter to calculate the integer clock period count, which is an approximation of the number of clock periods of the clock signal within one data period. The integer clock period count is typically stored in a count register. In some embodiments of the data capture circuit, rather than calculating the integer clock period count, the count register is programmed with the integer clock period count.

An integer N is computed from the integer clock period count, typically by dividing the integer clock period count by two in a divider. On the N-th occurrence of an active edge after the beginning of a data word, a data register captures the data word. In one embodiment of the data capture circuit, a first comparator is coupled to the divider and a counter. When the count in the counter, which is clocked by the clock signal, equals the integer N, the data register captures the data word. A second comparator is coupled to reset the counter to zero when the counter reaches the integer clock period count.

Some embodiments of the data capture circuit include an integer error compensation circuit to compensate for the error between the integer clock period count and the actual clock period count. Specifically, the integer error compensation circuit is coupled between the count register and the divider as well as between the count register and the second comparator. If the integer clock period count is greater than the actual clock period count and the cumulative error using the integer count period count is greater than or equal to half of a data period, the integer compensation circuit outputs the integer clock period count minus one. If the integer clock period count is less than the actual clock period count and the cumulative error using the integer clock period count is greater than or equal to half a data period, the integer compensation circuit outputs the integer clock period count plus one.

One embodiment of the integer error compensation circuit includes a compensation register to contain a timing error correction word, a shift register, and an adder. The timing error correction word is loaded into the shift register. On each new data word the shift register is clocked and the output bit of the shift register is added to the integer clock period count by the adder. A second embodiment of the integer compensation circuit uses a subtracter in place of or in conjunction with the adder. A third embodiment of the integer error compensation circuit replaces the compensation register with a lookup table which includes a plurality of timing error correction words. A fractional count register determines which timing error correction word is loaded into the shift register.

BRIEF DESCRIPTION OF THE DRAWINGS

FIG. 5(a) shows a block diagram of a clock period calculation circuit in accordance with a second embodiment of the invention.

FIG. 5(b) shows a block diagram of a clock period calculation circuit in accordance with a third embodiment of the invention.

DETAILED DESCRIPTION

According to the principles of this invention, certain limitations imposed by conventional data receivers have been overcome. The present invention provides a data capture circuit to capture data from a data transmitter operating at a different frequency or a different phase from the data receiver. For example, in one embodiment of the invention, the data capture circuit is in a device controller for an IDE/ATAPI CD-ROM drive to synchronize subcode data from a digital signal processor on the CD-ROM drive.

Figure 1:
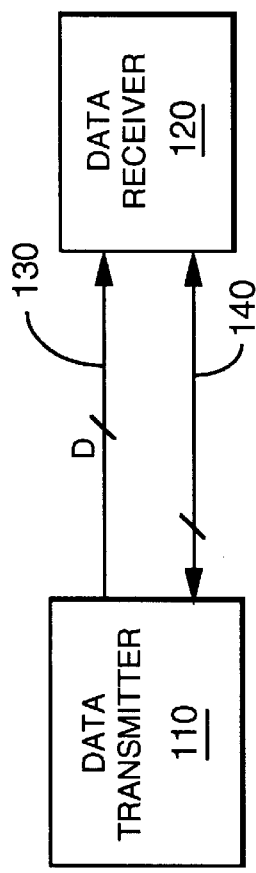
FIG. 1 shows a communication system with a data receiver and a data transmitter.
Figure 2:
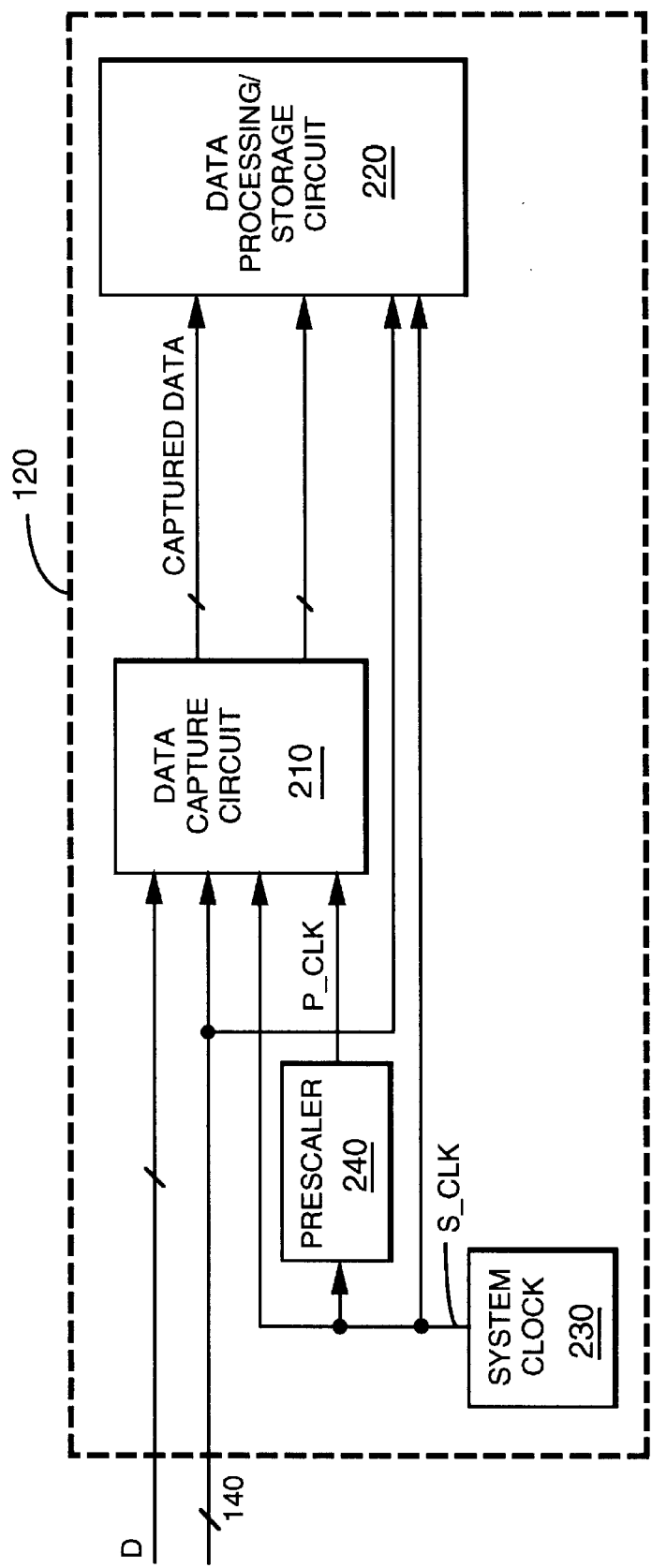
FIG. 2 shows a block diagram of a data receiver in accordance with a first embodiment of the invention.

FIG. 2 shows a block diagram of one embodiment of data receiver 120, which includes a data capture circuit 210, a data processing/storage circuit 220, a system clock 230, and an optional prescaler 240. Data capture circuit 210 receives data stream D from data transmitter 110 (FIG. 1) and provides data synchronized with system clock 230 to data processing/storage circuit 220. System clock 230 generates system clock signal S_CLK to provide timing for synchronous circuits of data receiver 120.

Optional prescaler 240 generates prescaled clock signal P_CLK, which has a lower frequency than system clock signal S_CLK. However, active edges of prescaled clock signal P_CLK are synchronized with active edges of system clock S_CLK. Generally, the frequency of prescaled clock signal P_CLK is equal to the frequency of system clock signal S_CLK divided by a multiple of two. Typically, prescaler 240 is only used in embodiments of data receiver 120 in which the frequency of system clock 230 is much greater than the frequency of data stream D. Various counters and comparators in data capture circuit 210 can use fewer bits if prescaler 240 is included in data receiver 120. Furthermore, reducing the clock frequency of the counters and comparators in data capture-circuit 210 lowers switching noise and power consumption in data capture circuit 210. For clarity, the circuits described herein use prescaled clock signal P_CLK. However, If prescaler 240 is not used, system clock signal S_CLK replaces prescaled clock signal P_CLK.

Some embodiments of data receiver 120 may include multiple clocks as well as asynchronous circuits. Data processing/storage circuit 220 uses the data from data transmitter 110 to perform whatever function data receiver 120 is designed to perform.

Figure 3:
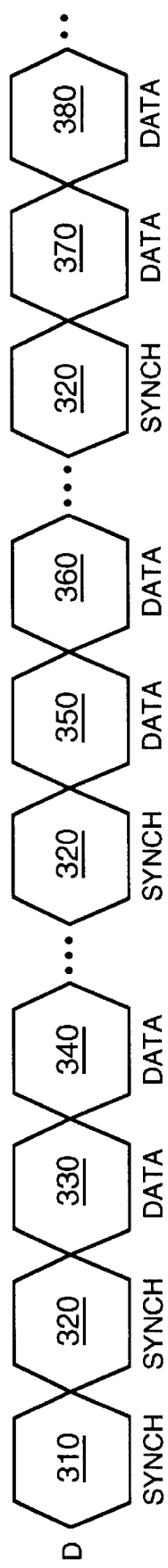
FIG. 3 shows an example of a data stream.

FIG. 3 shows a sample data stream D from data transmitter 110. If data transmitter 110 does not send a synchronized clock signal with data stream D, data transmitter 110 typically sends a block synch mark 310 at the beginning of a block of data. Furthermore, data transmitter 110 typically contains periodic synch marks 320 in data stream D. In some-data streams, the periodic synch mark right after block synch mark 310 is not used. Data words such as data word 330, 340, 350, 360, 370, and 380 are sent between periodic synch marks 320. For example, a CD-ROM subcode format uses a serial line to send eight data bits between each pair of periodic synch marks. The block synch mark for the CD-ROM subcode is 200/N microseconds (where N is a measure of the speed of the CD-ROM e.g. N=2 for 2× CD-ROMS) of logic low and-the periodic synch mark is between 11.3/N and 90/N microseconds of logic low followed by a logic high in the first data bit.

Each data word or data bit is transferred for a specific length of time called the data period. In some systems the data period is variable. For example, in a constant angular velocity disk system, data is read faster from the outer edge of the disk than the inner edge. Typically, for variable systems the data period changes slowly over time. Since the data words need time to transition between data periods, the signal strength of the data word is strongest at the center of the data period. In addition, sampling at the center of a data period provides the greatest error margin for sampling. Therefore, data capture circuit 210 should capture each data word near the middle of the data period.

Figure 4:
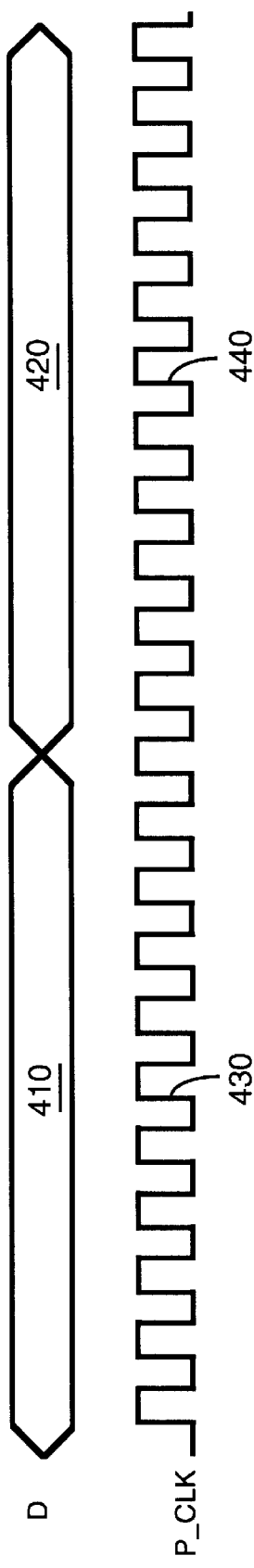
FIG. 4 shows a timing diagram for capturing data.

For embodiments of data capture circuit 120 using synchronous logic, data capture circuit should sample each data word on the active edge of prescaled clock signal P_CLK nearest the mid point of each data period. Thus, as shown in FIG. 4, data word 410, which could be a single data bit or multiple data bits in parallel, should be sampled at active (rising) edge 430 of prescaled clock signal P_CLK. Similarly, data word 420 should be sampled at active (rising) edge 440 of prescaled clock signal P_CLK. All of the examples and embodiments described herein use rising edges as the active edges for consistency; however, falling edges can also be used as the active edges.

To sample a data word near the middle of a data period, data capture circuit 210 must be provided with or dynamically calculate the number of prescaled clock periods in one data period, hereinafter called prescaled clock period count PCPC. As used herein, the prescaled clock period is the time between two consecutive active edges of prescaled clock signal P_CLK. Dynamic calculation of prescaled clock period count PCPC can provides better performance for variable speed data transmitters, since prescaled clock period count PCPC does not need to be repeatedly provided to data capture circuit 210 as prescaled clock period count PCPC changes. Most embodiments of data capture circuit 210 convert prescaled clock period count PCPC to an integer prescaled clock period count IPCPC by truncating or rounding any fractional part of prescaled clock period count PCPC.

FIG. 5(a) shows a block diagram of a prescaled clock period calculation circuit 500 to dynamically calculate integer prescaled clock period count IPCPC. A signal detect circuit 510 is coupled to receive a signal T_PER from data transmitter 110. Signal T_PER must have a periodic and distinctive feature having a period which has a fixed scaling factor SF with the data period. For example, in a CD-ROM drive a DSP chip includes a primary data channel and a subcode data channel for control bytes and user information. The primary data channel includes a word clock which has a period which is double the data period of the subcode data channel. If signal T_PER is a clock signal, the distinctive and detectable feature of the word clock can be either a rising edge or a falling edge. For the CD-ROM subcode using the word clock as signal T_PER, fixed scaling factor SF is equal to two. If no other appropriate signal T_PER is available, data stream D can be used for signal T_PER since periodic synch mark 320 (FIG. 3) is a periodic and distinctive feature.

Signal detection circuit 510 generates a reset/latch signal R/L and an enable signal EN. On each occurrence of the periodic and distinctive feature of signal T_PER, signal detection circuit 510 resets and enable counter 520. Counter 520, which is clocked by prescaled clock signal P_CLK counts the number of prescaled clock periods between a first occurrence of the periodic and distinctive feature of signal T_PER. and a second occurrence of the periodic and distinctive feature of signal T_PER. Multiplier/Divider circuit 530 multiplies or divides the output of counter 520 by fixed scaling factor SF. For example, for the CD-ROM word count. signal, multiplier/divider circuit 530 divides the output of counter 520 by two. Multiplier/divider circuit 530 drives the result of the multiplication or division to count register 540. On each occurrence of the periodic and distinctive feature of signal T_PER, signal detection circuit 510 causes count register 540 to store the output of multiplier divider circuit 530. Thus, count register 540 contains the integer prescaled clock period count IPCPC.

FIG. 5(b) shows a modification of the circuit of FIG. 5(a) to dynamically calculate both the integer prescaled clock period count IPCPC and a remainder prescaled clock period count RPCPC. In FIG. 5(b) a clock signal MUL*P_CLK, which has a frequency which is a multiple MUL of the frequency of prescaled clock signal P_CLK, is coupled to counter 520 in place of prescaled clock signal P_CLK. Multiplier/divider circuit 530 of FIG. 5 is replaced with a multiplier/divider circuit 530b which multiples or divides the output signal of counter 520 by fixed scaling factor SF as well as dividing by multiple MUL. Multiplier divider circuit 530b drives the integer quotient of the division by multiple MUL to count register 540 and the remainder from the division by multiple MUL to fractional count register 550. For example, if fixed scaling factor SF is equal to 2, multiple MUL is equal to 10, and the prescaled clock period count is equal to 8.72, then just before the occurrence of the periodic and distinctive feature of signal T_PER, counter 520 would contain 174, count register 540 would contain the integer quotient, int((174/2)/10)=8, and fractional count register 550 would contain the remainder, REM((174/2)/10)=7.

Figure 6:
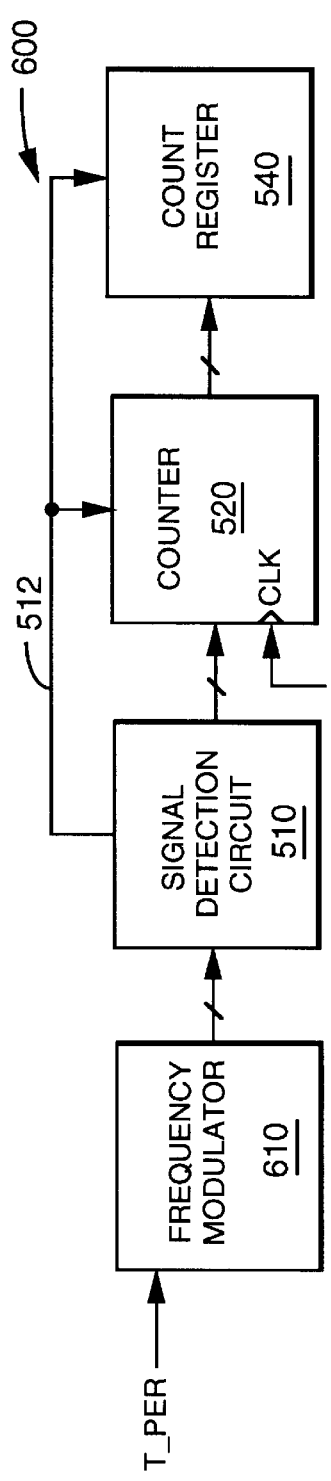
FIG. 6 shows a block diagram of a clock period calculation circuit in accordance with a fourth embodiment of the invention.

FIG. 6 shows a block diagram of an alternative prescaled clock period calculation circuit 600. Prescaled clock period calculation circuit 600 can be used when signal T_PER is a clock signal. Frequency modulator 610 modulates signal T_PER to provide signal detection circuit 510 with a clock signal having the same period as the data period of data stream D. Signal detection circuit 510, counter 520, and count register 540 perform as described above with respect to FIG. 5(a), except that multiplier/divider circuit 530 is not required. Clock period calculation circuit 600 can also be modified to calculate the remainder prescaled clock period count RPCPC as explained above with respect to FIG. 5(a) and FIG. 5(b).

Figure 7:
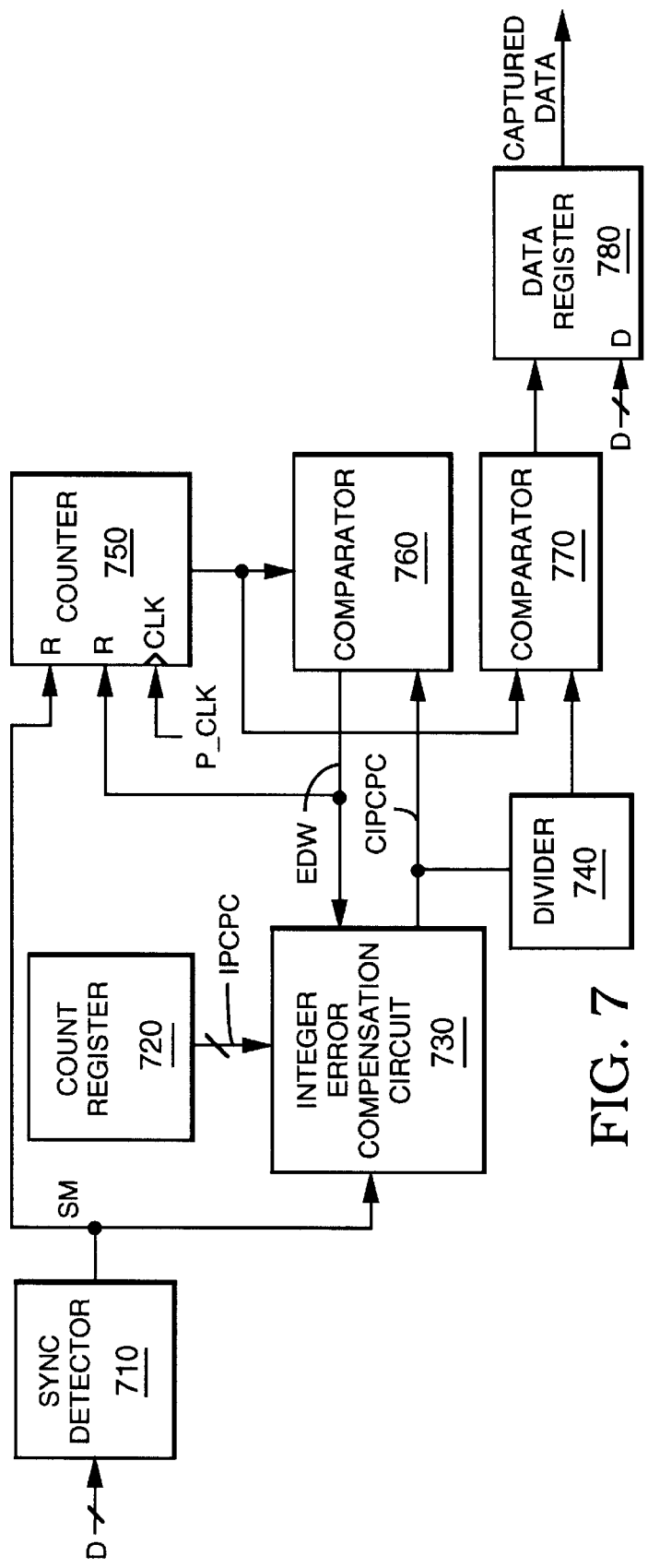
FIG. 7 shows a block diagram of a data capture circuit in accordance with a fifth embodiment of the invention.

FIG. 7 shows a block diagram of one embodiment of the data capture portion of data capture circuit 210. Data stream D is coupled to synch detector 710 and data register 780. Synch detector 710 detects periodic synch mark 320 (FIG. 3) and resets counter 750 at each occurrence of periodic synch mark 320 in data stream D. Counter 750 counts the number of prescaled clock periods after a periodic synchmark or a data word in data stream D.

Count register 720 contains integer prescaled clock period count IPCPC, which can be programmed or generated dynamically as explained above with respect to FIG. 5(a), FIG. 5(b), and FIG. 6. An optional integer error compensation circuit 730 can compensate for errors due to using integer prescaled clock period count IPCPC as explained in detail below. Both comparator 760 and divider 740 receives either the integer prescaled clock period count IPCPC from count register 720 or the compensated integer prescaled clock period count CIPCPC from integer error compensation circuit 730. For compactness, the signal to comparator 760 and divider 740 is referred to as compensated integer prescaled clock period count CIPCPC even for embodiments without integer error compensation circuit 730. Counter 750, which is clocked by prescaled clock signal P_CLK, counts the number of prescaled clock periods elapsed since the previous data word in data stream D. Comparator 760 compares the output of counter 750 with compensated integer prescaled clock period count CIPCPC. If comparator 760 evaluates to true i.e. the output of counter 750 is equal to compensated integer prescaled clock period count CIPCPC, data stream D has reached the end of a data word. Thus comparator 760 uses end of data word signal EDW to reset counter 750 to zero.

Divider 740 divides the compensated integer prescaled clock period count CIPCPC by two and rounds to the nearest integer so that comparator 770 can determine approximately the occurrence of the midpoint of the data period for the current data word in data stream D. Specifically, comparator 770 compares the output of counter 750 with the output of divider 740. If comparator 770 evaluates to true, i.e. the output of counter 750 is equal to the output of divider 740, then comparator 770 causes data register 780 to latch the current data word of data stream D by driving an active edge to the clock input terminal of data register 780. Data register 780 drives a captured data to data processing/storage circuit 220 (FIG. 2). In another embodiment of data capture circuit 210, data register 780 has a clock enable input terminal controlled by comparator 770 and is clocked by system clock signal S_CLK or prescaled clock signal P_CLK.

Figure 8:
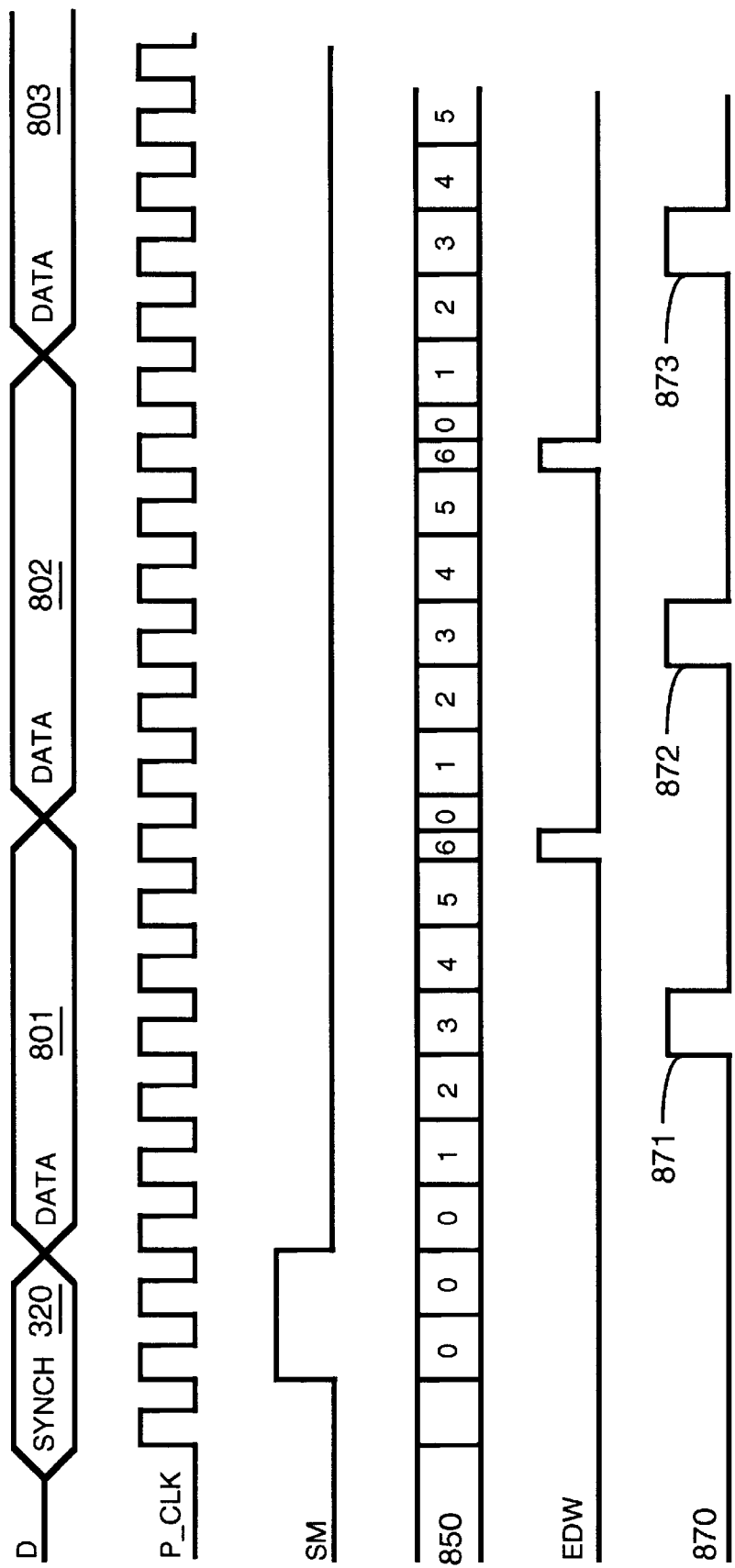
FIG. 8 shows a timing diagram for the data capture circuit of FIG. 7.

FIG. 8 shows a sample timing diagram for the circuit of FIG. 7. The data period of data stream D is equal to 6.75 prescaled clock periods in the example of FIG. 8. Thus, integer prescaled clock period IPCPC in FIG. 8 is equal to six for embodiments which truncate any fractional part of the prescaled clock period count PCPC. Signal SM, which represents the output of synch detector 710, is at logic high after identification of periodic synch mark 320 in data stream D until the end of periodic synch mark 320. Signal 850, which represents the output of counter 750, counts on every active edge of prescaled clock signal P_CLK unless synch detector 710 or comparator 760 resets counter 750. End of word signal EDW, which represents the output of comparator 760, is at logic high when the output of counter 750 is equal to integer prescaled clock period count IPCPC, which in this example is six because the actual data period is equal to 6.75 prescaled clock periods. When end of word signal EDW is at logic high, counter 750 is reset to zero. Signal 870, which represents the output of comparator 770, is at logic high when the output of counter 750 is equal to the output of divider 740, which in this example is three. Thus, data register 780 captures data word 801 at rising edge 871, which corresponds to the third occurrence of an active edge of prescaled clock signal P_CLK after the beginning of data word 801. Data register 780 captures data word 802 at rising edge 872, which corresponds to the sixth or the first IPCPC-th occurrence of an active edge after the third occurrence of an active edge since the beginning of data word 801. Data register 780 captures data word 803 at rising edge 873, which corresponds with the second IPCPC-th, i.e., the twelfth, occurrence of an active edge after the third occurrence of an active edge since the beginning of data word 801. Alternatively, data register 780 can be a clock enabled register. In FIG. 8, rising edges are active edges and logic high is the active state; however, other embodiments may use falling edges as active edges and logic low as the active state.

Integer error compensation circuit 730 is not required if integer prescaled clock period count IPCPC is large, the data period is an integral multiple of the prescaled clock period, the integer prescaled clock period count is dynamically calculated repeatedly, or only a few data words lie between each pair of periodic synch marks 320. Otherwise, integer error compensation circuit may be necessary to insure that data register 780 samples the data word near the middle of each data period of data stream D. As shown in FIG. 8, for each successive data word after a periodic synch mark 320 in data stream D, data register 780 samples the data word earlier during the data period. If too many data words follow a periodic synch mark 320 before the next periodic synch mark 320 data register 780 is likely to sample the data word too early.

Integer compensation circuit 730 (FIG. 7) determines the data word timing error on each data word between the actual end of a data period and the end of the data period based on the integer prescaled clock period count IPCPC. If the fractional part of prescaled clock period count PCPC is truncated or rounded down, data register 780 (FIG. 7) samples the data word earlier for each successive data word. When the data word timing error is greater than or equal to half a prescaled clock period, integer compensation circuit 730 increments the integer prescaled clock period count IPCPC by one before driving compensated integer prescaled clock period count CIPCPC to comparator 760 and divider 740. Some embodiments only compensate when the data word timing error is greater than half a prescaled clock period. If the fractional part of prescaled clock period count PCPC is rounded up, data register 780 samples the data word later for each successive data word. When the data word timing error is greater than or equal to half a prescaled clock period, integer compensation circuit 730 decrements the integer prescaled clock period count IPCPC before driving compensated integer prescaled clock period count CIPCPC to comparator 760 and divider 740. Some embodiments only compensate when the data word timing error is greater than half a prescaled clock period.

For example, the data period for FIG. 8 is 6.75 prescaled clock periods. Therefore, the ideal sampling times for the first ten data words after periodic synch mark 320 is (given in prescaled clock periods): 3.375, 10.125, 16.875, 23.625, 30.375, 37.125, 43.875, 50.625, 57.375, and 64.125. If six is used as the integer prescaled clock period count IPCPC the actual sampling times are at active edges :3, 9, 15, 21, 27, 33, 39, 45, 51, 57. Thus sampling of the data words after the first four data words is likely to result in an error. TABLE 1 summarizes cumulative error caused by using only the integer prescaled clock period count IPCPC.

TABLE 1

| DATA WORD# | IDEAL SAMPLING TIME | ACTUAL SAMPLING EDGE | CUMULATIVE ERROR |
| --- | --- | --- | --- |
| 1 | 3.375 | 3 | 0.375 |
| 2 | 10.125 | 9 | 1.125 |
| 3 | 16.875 | 15 | 1.875 |
| 4 | 23.625 | 21 | 2.625 |
| 5 | 30.375 | 27 | 3.375 |
| 6 | 37.125 | 33 | 4.125 |
| 7 | 43.875 | 39 | 4.875 |
| 8 | 50.625 | 45 | 5.625 |
| 9 | 57.375 | 51 | 6.375 |
| 10 | 64.125 | 57 | 7.125 |

Integer compensation-circuit 730 modifies the sampling time based on the data word timing error so that the modified sampling times are at active edges: 4, 11, 17, 24, 31, 38, 44, 51, 58, and 65. TABLE 2 summarizes the effects of using integer error compensation circuit 730 for the example of FIG. 8 using integer prescaled clock period count IPCPC equal to six. In TABLE 2, column two labeled "ERROR IF NO COMPEN." is the error that would result for each data word if no compensation is used with that data word. Column five labeled "NEW CUMUL. ERROR" is the actual cumulative error after each data word.

TABLE 2

| DATA WORD# | ERROR IF NO COMPEN. | COMPEN. Y/N? | COMPEN. S_CLOCK PERIODS | NEW CUMUL. ERROR | DATA START PERIOD | SAMPLE EDGE |
| --- | --- | --- | --- | --- | --- | --- |
| 1 | −0.75 | Y | 7 | 0.25 | 0 | 4 |
| 2 | −0.5 | Y | 7 | 0.5 | 7 | 11 |
| 3 | −0.25 | N | 6 | −0.25 | 14 | 17 |
| 4 | −1.0 | Y | 7 | 0 | 20 | 24 |
| 5 | −0.75 | Y | 7 | 0.25 | 27 | 31 |
| 6 | −0.5 | Y | 7 | 0.5 | 34 | 38 |
| 7 | −0.25 | N | 6 | −0.25 | 41 | 44 |
| 8 | 0.75 | Y | 7 | 0 | 47 | 51 |
| 9 | −0.5 | Y | 7 | 0.25 | 54 | 58 |
| 10 | −0.25 | Y | 7 | 0.5 | 61 | 65 |

After data word #1 (data word 801 in FIG. 8) the end of data word timing error without compensation would be −0.75 since the integer prescaled clock period is six while the data period is actually 6.75 prescaled clock periods. Therefore, integer error compensation circuit 730 increments integer prescaled clock period count IPCPC to drive compensated integer prescaled clock period CIPCPC equal to seven. After seven prescaled clock periods the data word timing error is 0.25 because the data period is only 6.75 prescaled clock periods. In this example, comparator 770 causes data register 780 to sample at the third occurrence of an active edge of prescaled clock signal P_CLK after counter 750 is reset if integer error compensation circuit 730 does not increment integer prescaled clock period count IPCPC. However, if integer error compensation circuit 730 increments integer prescaled clock period count IPCPC comparator 770 causes data register 780 to sample at the fourth occurrence of an active edge of prescaled clock signal P_CLK After data word #2 (data word 802 in FIG. 8) the end of data word timing error would be −0.5 if no compensation is made to compensated integer prescaled clock period count CIPCPC. Therefore, integer error compensation error increments integer prescaled clock period count IPCPC to drive compensated integer prescaled clock period count equal to seven. After seven prescaled clock periods the end of data word timing error is 0.5. After data word #3 (data word 803 in FIG. 8) the end of data word timing error would be −0.25 if no compensation is made to compensated integer prescaled clock period count CIPCPC, therefore the integer prescaled clock period count IPCPC is not incremented. Compensation for the remaining data words are similar. As shown in column five of TABLE 2, the cumulative error does not exceed 0.5 prescaled clock periods.

TABLE 3 summarizes the effects of using integer error compensation circuit 730 for the example of FIG. 8 using integer prescaled clock period count IPCPC equal to seven.

decrements integer prescaled clock period count IPCPC or at the four active edges of prescaled clock signal P_CLK if integer error compensation circuit 730 does not decrement-integer prescaled clock period count IPCPC.

After data word #2 the end of data word timing error would be 0.5 if no compensation is made to integer prescaled clock period count IPCPC. Therefore, integer error compensation circuit 730 decrements the integer prescaled clock period count IPCPC and drives compensated integer prescaled clock period count equal to six. After six prescaled clock periods the data word timing error is −0.5. After data word #3 the data word timing error would be −0.25 if no compensation is made to the integer prescaled clock period count IPCPC, therefore the integer prescaled clock period count IPCPC is not decremented and compensated integer prescaled clock period count CIPCPC is seven. Compensation for the remaining data words are similar.

Figure 9A:
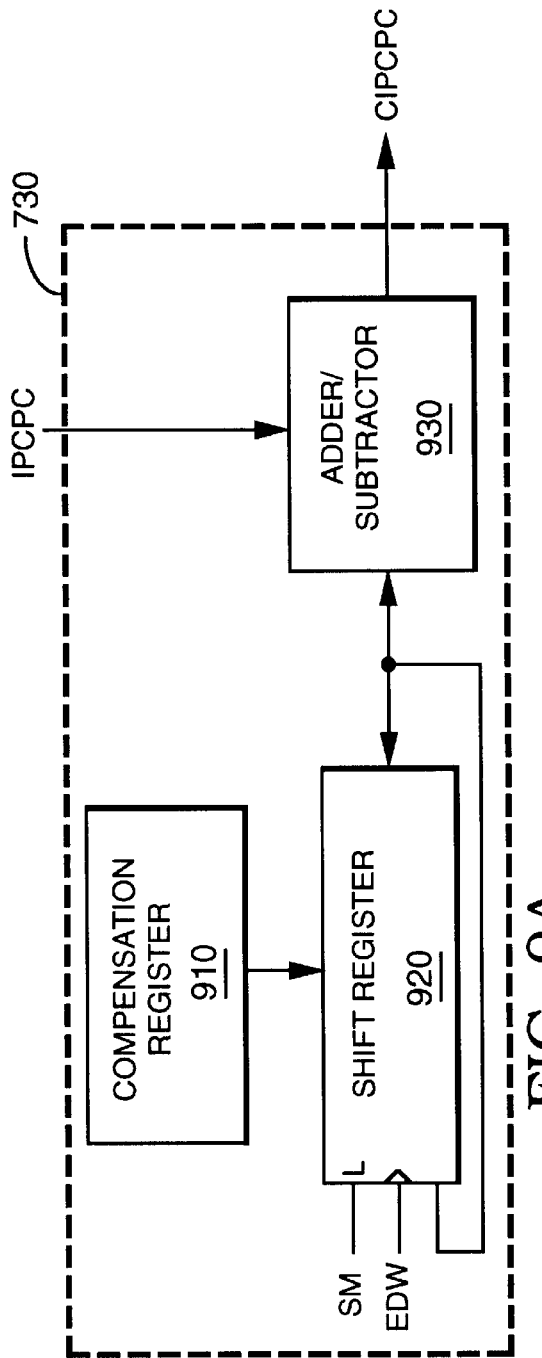
FIG. 9(a) shows a block diagram of an integer error compensation circuit in accordance with a sixth embodiment of the invention.

FIG. 9(*a*) is a block diagram of one embodiment of integer error compensation circuit 730. A compensation register 910 contains a timing error correction word based on the value of the fractional portion of prescaled clock period count PCPC. Examples and generation of timing error correction words are described in detail below. A shift register 920 loads the timing error correction word whenever synch detector 710 (FIG. 7) detects a periodic synch mark 320 in data stream D. When comparator 760 (FIG. 7) evaluates to true, which signifies the end of a data word, shift register 920 is clocked by end of data word signal EDW from comparator 760 (FIG. 7). In FIG. 9(*a*), shift register 920 is a left-shift register; Therefore, the binary digits in shift register 920 are shifted one bit to the left on every active edge of end of data word signal EDW. Typically, shift register 920 is a barrel shifter so that the output bit, i.e., the left-most bit of a left-shift register, becomes an input bit, i.e., the right most bit of a left-shift register, after a shift operation. If integer prescaled clock period count IPCPC is less than the actual number of prescaled clock periods in one

TABLE 3

| DATA WORD# | ERROR IF NO COMPEN. | COMPEN. Y/N? | COMPEN. S_CLOCK PERIODS | NEW CUMUL. ERROR | DATA START PERIOD | SAMPLE EDGE |
|---|---|---|---|---|---|---|
| 1 | 0.25 | N | 7 | 0.25 | 0 | 4 |
| 2 | 0.5 | Y | 6 | −0.5 | 7 | 10 |
| 3 | −0.25 | N | 7 | −0.25 | 13 | 17 |
| 4 | 0 | N | 7 | 0 | 20 | 24 |
| 5 | 0.25 | N | 7 | 0.25 | 27 | 31 |
| 6 | 0.5 | Y | 6 | −0.5 | 34 | 37 |
| 7 | −0.25 | N | 7 | −0.25 | 40 | 44 |
| 8 | 0 | N | 7 | 0 | 47 | 51 |
| 9 | 0.25 | N | 7 | 0.25 | 54 | 58 |
| 10 | 0.5 | Y | 6 | −0.5 | 61 | 64 |

After data word #1 the end of data word timing error without compensation would be 0.25 since the integer prescaled clock period is seven while the data period is really 6.75 prescaled clock periods. Therefore, integer error compensation circuit 730 does not decrement integer prescaled clock period count IPCPC and drives compensated integer prescaled clock period count CIPCPC equal to seven. After seven prescaled clock periods the data word timing error is 0.25 since the data period is only 6.75 prescaled clock periods. In this example, comparator 770 causes data register 780 to sample at the third occurrence of an active edge of prescaled clock signal P_CLK after counter 750 is reset if integer error compensation circuit 730 data period, adder/subtracter 930 adds the output bit of shift register 921, i.e. the left-most bit of a left-shift register, to the integer prescaled clock period count to generate compensated integer prescaled clock period count CIPCPC. If integer prescaled clock period count IPCPC is greater than the actual number of prescaled clock periods in one data period, adder/subtracter 930 subtracts the output bit of shift register 920 from integer prescaled clock period count IPCPC to generate compensated integer prescaled clock period count CIPCPC. Other embodiments of integer error compensation circuit 730 can use a right-shift register by flipping the timing error correction word and coupling the output bit of the right-shift register, i.e., the right-most bit, to adder/subtracter 930.

The exact timing error correction word for each embodiment of integer error compensation circuit 730 depends on the fractional portion of prescaled clock period count PCPC. Specifically, each bit of the timing error correction word corresponds to a data word in data stream D. Beginning after a periodic synch mark 320, the first data word of data stream D corresponds to the left most bit of the timing error correction word. The second data word after a periodic synch mark 320 corresponds to the second left most bit of the timing error correction word. Alternatively the correspondence between the bits of the timing error correction word and the data words can start with the right most bit. The minimum length Lmin of the timing error correction word is:

Lmin=$N$/Frac, where Frac is the fractional portion of the prescaled clock period count, and N is the smallest integer which causes Lmin to also be an integer. In other words, Lmin is the smallest denominator of any possible representation of the fractional portion of the prescaled clock period count as a numerator over a denominator. For example, if the fractional portion of the prescaled clock period count is 0.25 then N is equal to one and Lmin is equal to four. If the fractional portion of the prescaled clock period count is equal to 0.7, then N is equal to seven and Lmin is equal to ten. However, if Lmin is greater than the number of data words in between two successive periodic sync marks 320 in data stream D, then the number of bits required is equal to the number of data words between two successive periodic synch marks 320.

As explained above whenever the end of word timing error of a particular data word is equal to or greater then half of a data period, integer error compensation circuit 730 should increment or decrement integer prescaled clock period count IPCPC to generate compensated prescaled clock period count CIPCPC. Therefore, the bit in the timing error correction word corresponding to the data period where compensation is required should be set to one. Thus in the example of Table 1, the timing error correction word is 1101 (binary), which corresponds to the third column of table 1 where a Y is a 1 and an N is a 0. Similarly, the timing error correction word is 0100 (binary) for the example in table 2.

The degree of accuracy required of the fractional portion of prescaled clock period count is dependent upon the number of prescaled clock periods in each data period, and the number of data words in between successive periodic synch marks 320 in data stream D. Typically, the fractional portion of the prescaled clock period count is rounded to a positive or negative rational number expressed as a numerator NUM divided by a denominator DEN where NUM and DEN are integers and NUM<DEN. In this case Lmin is equal NUM. Table 3 gives sample left-shift versions of timing error correction words for various values of NUM and DEN for embodiments of data capture circuit 210 in which the fractional portion of the prescaled clock period count is rounded down or truncated in the calculation of integer prescaled clock period count IPCPC. For embodiments of data capture circuit 210 in which the fractional portion of the prescaled clock period count is rounded up in the calculation of integer prescaled clock period count IPCPC, the timing error correction word can be used if each bit is inverted.

TABLE 3

| DEN | NUM | Timing Error Correction Word (binary) |
|---|---|---|
| 2 | 1 | 10 |
| 3 | 1 | 010 |
|   | 2 | 101 |
| 4 | 1 | 0100 |
|   | 2 | 1010 |
|   | 3 | 1101 |
| 5 | 1 | 00100 |
|   | 2 | 01010 |
|   | 3 | 10101 |
|   | 4 | 11011 |
| 10 | 1 | 0000100000 |
|   | 2 | 0010000100 |
|   | 3 | 0100100010 |
|   | 4 | 0101001010 |
|   | 5 | 1010101010 |
|   | 6 | 1010110101 |
|   | 7 | 1011101101 |
|   | 8 | 1101111011 |
|   | 9 | 1111101111 |

Figure 9B:
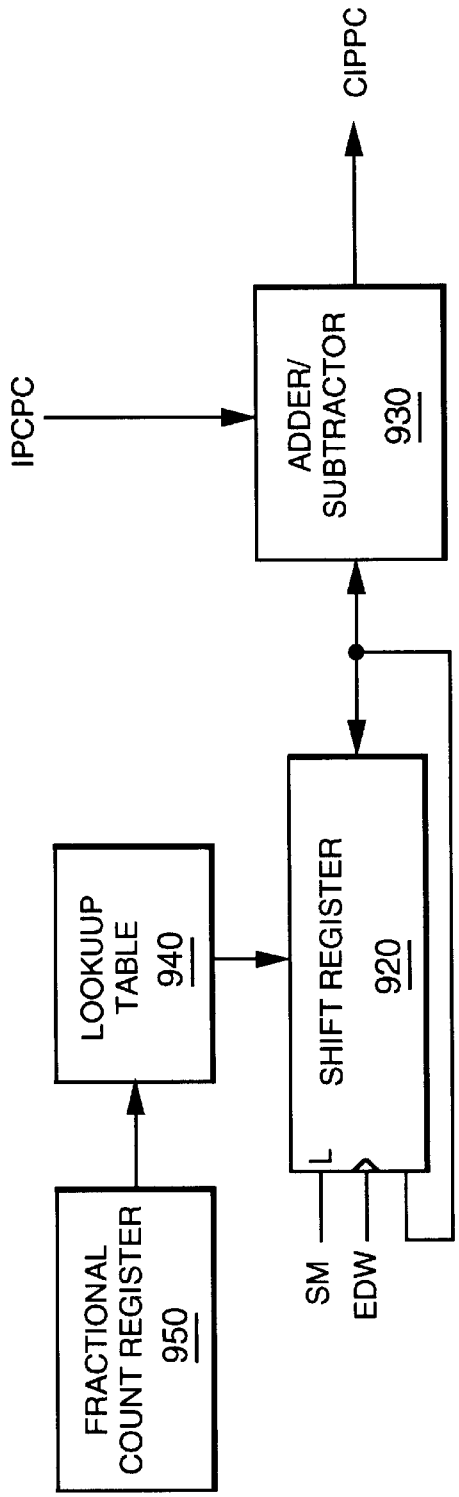
FIG. 9(b) shows a block diagram of an integer error compensation circuit in accordance with a seventh embodiment of the invention.

FIG. 9(b) is a block diagram of an embodiment of integer error compensation circuit 730 suitable for embodiments of data capture circuit 210 in which prescaled clock period count PCPC varies. Specifically, the fractional portion of prescaled clock period count PCPC is rationalized using a fixed denominator DEN. A lookup table 940 contains the timing error correction words for all the DEN-1 possible values of numerator NUM for the rationalized fractional portion of prescaled clock period count PCPC. Fractional count register 950 contains numerator NUM for the current set of data words. The output of fractional count register 950 is used to select the corresponding timing error correction word from lookup table 940. Shift register 920 loads a timing error correction word from lookup table 940 whenever synch detector 710 (FIG. 7) detects a periodic synch mark 320 in data stream D. The function of shift register 920 in FIG. 9(b) is identical to the description given above with respect to FIG. 9(a).

The circuit of FIG. 5(b) can be used to dynamically calculate the value for fractional count register 950, which would be equivalent to the value in fractional count register 550 (FIG. 5). Specifically, the denominator DEN of FIG. 9 is equal to multiple MUL of FIG. 5. The remainder generated by multiplier/divider circuit 530b is equal to numerator NUM.

Thus, by using a data capture circuit according to the principles of this invention, a data receiver is able to optimally capture data words from a data transmitter operating at a different phase or frequency without relying on expensive dual ported memory buffers or clocking signals from the data transmitter. Specifically, the data capture circuit is able to dynamically calculate the number of clock periods in each data word so that the data capture circuit can capture the data word at the data word's peak signal strength. Furthermore, a novel integer error compensation circuit dynamically adjusts the exact capture time of each data word.

The various embodiments of the structure and method of this invention that are described above are illustrative only of the principles of this invention and are not intended to limit the scope of the invention to the particular embodiments described. In view of this disclosure, those skilled-in-the-art can define other data capture circuits, integer compensation circuits, counters, multipliers, dividers, signal detection circuits, registers, comparators, synch detectors, data streams, synch marks, and use these alternative features to create a method or system of automated cache management according to the principles of this invention.

APPENDIX A

Copyright © 1996, 1997 by
Integrated Memory Logic Inc.

```
//*****************************************************
//      Code Name   : v4uart.v                         *
//      Block       : v4 subcode interface             *
//*****************************************************
`timescale 1 ns / 10 ps
module v4uart (
        v4bitsr, v4qsr, v4wrsuberr, v4synerr, fxbitclk,
                ldv4buf, ldv4qbuf, v4qshft, v4subdout,
                v4blkdn,
        v4blkrst, v4stblktxf, v4bytecnt, fsysckcnt,
                sub, sccr, psclk, v4md, aqgnt, ejsfsy2,
                sccrlsb,
        sccrptv, lrclk, dscd, qdecen, iovsmp, crst
        ) ;
input           sub;        // subcode serial data input
input   [7:0]   sccr;       // control subcode latch timing
in v4    interface
input           psclk;      // master clock
input           v4md;       // sub format select
input           aqgnt;      //
input           ejsfsy2;    //
input   [1:0]   sccrlsb;
input   [7:0]   sccrptv;
input           lrclk;
input           dscd;
input           qdecen;
input   [1:0]   iovsmp;
input           crst;       // chip reset
output  [7:0]   v4bitsr;    // extracted subcode data
output  [7:0]   v4qsr;      // extracted subq data
output          v4wrsuberr; // update ecc status
register bit 6
output          v4synerr;   // v4 sync error
output          fxbitclk;   // free run bit clock
output          ldv4buf;
output          ldv4qbuf;
output          v4qshft;
output          v4subdout;  //
output          v4blkdn;    // txf block done
output          v4blkrst;   // reset blk byte count
output          v4stblktxf; // blk txf start
output  [6:0]   v4bytecnt;
output  [9:0]   fsysckcnt;
reg     [9:0]   exckcnt;
reg     [9:0]   fxexckcnt;
reg     [7:0]   v4bitsr;
reg     [7:0]   v4qsr;
reg     [3:0]   bitcnt;
reg             mark;
reg             sdsyn1;
reg             sdsyn2;
reg             sdsyn3;
reg             bitclk_d1c;
reg     [6:0]   v4bytecnt;
reg     [4:0]   zbitcnt;
reg             v4syncon;
reg             v4syncwd;
reg             ldv4buf;
reg             byteis96_d1c;
reg     [10:0]  sysckcnt;
reg     [9:0]   fsysckcnt;
reg     [9:0]   cavsysckcnt;
reg             lrclk_d1c;
reg             lrclk_d2c;
reg             lrclk_d3c;
reg             restartcnt_d1c;
wire            ldv4qbuf;
wire            restartcnt;
wire            bitclk;
wire            fxbitclk;
wire            ldexcnt;
wire            ldfxexcnt;
wire            ldbitcnt;
```

APPENDIX A-continued

```
wire            bitshft;
wire            v4lastbit;
wire            v4subdout;
wire            v4qshft;
wire            byteis96;
wire            v4stblktxf;
wire            rstfxcnt;
wire    [9:0]   numcyc;
wire    [8:0]   hnumcyc;
wire            ld_sysckcnt;
wire            rst_sysckcnt;
wire            ld_cavcnt;
wire    [9:0]   sbckcnt;
always @ (posedge psclk)
    begin
        lrclk_d1c <= lrclk;
        lrclk_d2c <= lrclk_d1c;
        lrclk_d3c <= lrclk_d2c;
    end
assign ld_sysckcnt = lrclk_d2c & ~lrclk_d3c;
assign rst_sysckcnt = ld_sysckcnt;
always @ (posedge psclk or posedge crst)
    if (crst) sysckcnt <= 0;
    else if (rst_sysckcnt) sysckcnt <= 0;
    else if (~dscd) sysckcnt <= sysckcnt + 1;
assign sbckcnt = (iovsmp == 2'b11)
        ? {stsckcnt [7:1] , 3=b100}:
            (iovsmp == 2'b10) ? {sysckcnt [8:1] , 2=b10}:
            (iovsmp == 2'b01) ? {sysckcnt [9:1] , 1=b0}:
                sysckcnt [10:1];
always @ (posedge psclk or posedge crst)
    if (crst) fsysckcnt <= 10'h220;
    else if (ld_sysckcnt) fsysckcnt <= sbckcnt;
always @ (posedge psclk or posedge crst)
    if (crst) cavsysckcnt <= 10'h20;
    else if (ld_cavcnt) cavsysckcnt <= fsysckcnt;
always @ (posedge psclk)
    begin
        sdsyn1 <= sub & qdecen;
        sdsyn2 <= sdsyn1;
        sdsyn3 <= sdsyn2;
    end
assign sccrptout =  (bitcnt == 4'b0111) ? sccrptv [7]:
                    (bitcnt == 4'b0110) ? sccrptv [6]:
                    (bitcnt == 4'b0101) ? sccrptv [5]:
                    (bitcnt == 4'b0100) ? sccrptv [4]:
                    (bitcnt == 4'b0011) ? sccrptv [3]:
                    (bitcnt == 4'b0010) ? sccrptv [2]:
                    (bitcnt == 4'b0001) ? sccrptv [1]:
                        sccrptv [0];
always @ (posedge psclk or posedge crst)
    if (crst) exckcnt <= 0;
    else if (restartcnt | ldexcnt | ~qdecen)
        exckcnt <= 0;
    else if (v4md) exckcnt <= exckcnt + 1;
assign numcyc = dscd ? {sccr,sccrlsb}
                    + sccrptout: cavsysckcnt;
assign ldexcnt = (exckcnt == numcyc);
assign restartcnt = (exckcnt == 0) & ~sdsyn2 & mark |
                    ldexcnt & mark;
always @ (posedge psclk)
    restartcnt_d1c <= restartcnt;
assign hnumcyc = dscd
        ? {sccr,sccrlsb[1]}: cavsysckcnt [9:1];
assign bitclk = (exckcnt == hnumcyc);
always @ (posedge psclk)
    bitclk_d1c <= bitclk;
always @ (posedge psclk or posedge crst)
    begin
        if (crst)         bitcnt <= 4'b0;
        else if (ldbitcnt) bitcnt <= 4'h8;
        else if (bitshft & (~mark | sdsyn2))
                bitcnt <= bitcnt - 1'b1;
    end
assign ldbitcnt = (bitcnt == 4'b0);
assign bitshft = (bitcnt '= 4'h0) & bitclk
        & (~mark | sdsyn2);
always @ (posedge psclk or posedge crst)
    begin
```

APPENDIX A-continued

```
        if (crst) mark <= 1=b1;
        else    mark <= v4syncwd | v4lastbit
                        | mark & (~bitclk | ~sdsyn2);
        end
assign v4lastbit = (bitcnt == 4'b0) & bitclk_d1c;
always @ (posedge psclk)
        ldv4buf <= v4lastbit & v4syncon;
always @ (posedge psclk or posedge crst)
        if (crst) v4bitsr [7:0] <= 0;
        else if (bitshft)
            begin
                v4bitsr [7:0] <=
                        {v4bitsr [6:0], v4subdout};
            end
assign v4subdout = sdsyn2 & v4md;
assign v4qshft = bitshft & (bitcnt == 4'h7);
always @ (posedge psclk or posedge crst)
        if (crst) v4qsr [7:0] <= 0;
        else if (v4stblktxf) v4qsr [7:0] <= 0;
        else if (v4qshft)
            begin
                v4qsr [7:0] <= {v4qsr [6:0], v4subdout};
            end
assign ldv4qbuf = v4lastbit & v4syncon
                        & (v4bytecnt [2:0] == 3'b111);
always @ (posedge psclk or posedge crst)
        if (crst) v4bytecnt <= 0;
        else if (v4syncwd) v4bytecnt <= 0;
        else if (v4lastbit) v4bytecnt <= v4bytecnt + 1'b1;
always @ (posedge psclk or posedge crst)
        if (crst) fxexckcnt <= 0;
        else if (ldfxexcnt | rstfxcnt | ~qdecen)
                fxexckcnt <= 0;
        else fxexckcnt <= fxexckcnt + 1;
assign rstfxcnt = v4md ? sdsyn2: ~ejsfsy2;
assign ld_cavcnt = v4md ? (ldexcnt | restartcnt &
restartcnt_d1c &
                        ldfxexcnt): ldfxexcnt;
assign ldfxexcnt = (fxexckcnt == numcyc)
                        | (fxexckcnt == (numcyc + 1));
assign fxbitclk = ldfxexcnt;
always @ (posedge psclk or posedge crst)
        if (crst) zbitcnt <= 0;
        else if (fxbitclk & ~v4subdout & ~v4syncwd & v4md)
                zbitcnt <= zbitcnt + 1'b1;
        else if (v4subdout) zbitcnt <= 0;
always @ (posedge psclk or posedge crst)
        if (crst) v4syncon <= 0;
        else if (v4stblktxf) v4syncon <= 1"b1;
        else if ((v4bytecnt == 7'd96) & aqgnt | v4synerr)
                v4syncon <= 0;
assign byteis96 = (v4bytecnt == 7'd96);
always @ (posedge psclk)
        byteis96_d1c <= byteis96;
assign v4blkdn = byteis96 & ~byteis96_d1c;
always @ (posedge psclk or posedge crst)
        if (crst) v4syncwd <= 0;
// else if ((zbitcnt == 5'h11) & ~sdsyn2)
                v4syncwd <= 1"b1;
        else if ((zbitcnt == 5'h10) & ~sdsyn2)
                v4syncwd <= 1'b1;
        else v4syncwd <= 1'b0;
always @ (posedge psclk)
        v4syncwd_d1c <= v4syncwd;
assign v4stblktxf = ~v4syncwd & v4syncwd_d1c;
assign v4blkrst = v4stblktxf;
assign v4wrsuberr = v4syncwd & ~v4syncwd_d1c;
assign v4synerr = (v4bytecnt != 7'd96) & v4wrsuberr;
endmodule
```

I claim:

1. A method for capturing data from a data stream containing a plurality of data words, wherein each of said data words is transmitted for a data period and wherein each data period lasts for a clock period count of clock periods of a clock signal, said method comprising:

receiving an integer clock period count representing an approximation of said clock period count;

calculating a compensated integer clock period count CICPC to compensate for a first difference between said clock period count and said integer clock period count;

calculating an integer N, wherein said integer number N is less than said compensated integer clock period count CICPC; and capturing a first data word at a N-th occurrence of an active edge of said clock signal after a beginning of said first data word.

2. The method of claim 1, wherein said integer number N is equal to half of said compensated integer clock period count CICPC if said compensated integer clock period count is an even number; and said integer number N is equal to half of said compensated integer clock period count CICPC plus 0.5 if said compensated integer clock period count CICPC is an odd number.

3. The method of claim 1, wherein said capturing a first data word at a N-th occurrence of an active edge of said clock signal after a beginning of said first data word comprises:

counting each occurrence of said active edge of said clock signal to form a count of said active edges of said clock signal;

comparing said count to said integer number N; and capturing said first data word if said count equals said integer N.

4. The method of claim 1 wherein said calculating a compensated integer clock period count CICPC to compensate for a first difference between said clock period count and said integer clock period count comprises:

equating said compensated integer clock period count CICPC to said integer clock period count if said clock period count minus said integer clock period count is less than 0.5; and equating said compensated integer clock period count CICPC to said integer clock period count plus one if said clock period count minus said integer clock period count is greater than or equal to 0.5.

5. The method of claim 1 wherein said calculating a compensated integer clock period count CICPC to compensate for a first difference between said clock period count and said integer clock period count comprises:

equating said compensated integer clock period count CICPC to said integer clock period count if said integer clock period count minus said clock period count is less than 0.5; and equating said compensated integer clock period count CICPC to said integer clock period count minus one if said integer clock period count minus said clock period count is greater than or equal to 0.5.

6. The method of claim 1, further comprising:

calculating a second compensated integer clock period count SCICPC to compensate for said second difference between said clock period count and said compensated integer clock period count CICPC;

capturing a second data word on a first SCICPC-th occurrence of an active edge of said clock signal following said N-th occurrence of an active edge of said clock signal.

7. The method of claim 6, further comprising calculating a third compensated integer clock period count TCICPC to compensate for said second difference and a third difference between said clock period count and said second compensated integer clock period count SCICPC;

capturing a third data word on a second TCICPC-th occurrence of an active edge of said clock signal following said SCICPC-th occurrence of said active edge of said clock signal following said N-th occurrence of an active edge of said clock signal.

8. A data capture circuit configured to capture a plurality of data words from a data stream, wherein each of said data words is transmitted for a data period and wherein each data period lasts for a clock period count of clock periods of a clock signal, said circuit comprising:

an integer clock count register configured to contain an integer clock period count;

an integer error compensation circuit coupled to said integer clock count register;

a data register coupled to said integer error compensation circuit and configured to receive said data stream;

a synch detector configured to detect a synch mark in said data stream;

a counter coupled to said clock signal and said sync detector- and a first comparator coupled to said counter, said integer error compensation circuit said data register.

9. The data capture circuit of claim 8, wherein said synch detector is configured to reset said counter on each occurrence of said synch mark;

said first comparator compares a counter output of said counter with a value from said clock period calculation circuit; and said first comparator causes said data register to capture a data word if said counter output equals said value from said clock period calculation circuit.

10. The data capture circuit of claim 8, wherein said integer error compensation circuit comprises:

a compensation register configured to contain a timing error correction word;

a shift register having an output bit and an parallel load port, wherein said parallel load port is coupled to receive said timing error correction word from said compensation register; and an adder coupled between said integer clock count register and said first comparator, wherein said adder adds said output bit of said shift register to an output of said integer clock count register.

11. The data capture circuit of claim 8, wherein said integer error compensation circuit comprises:

a compensation register configured to contain a timing error correction word;

a shift register having an output bit and an parallel load port, wherein said parallel load port is coupled to receive said timing error correction word from said compensation register; and a subtracter coupled between said integer clock count register and said first comparator, wherein said subtracter subtracts said output bit of said shift register from an output of said integer clock count register.

12. The data capture circuit of claim 8, wherein said integer error compensation circuit comprises:

a lookup table configured to contain a plurality of timing error correction words;

a fractional count register coupled to control an output of said lookup table;

a shift register having an output bit and an parallel load port, wherein said parallel load port is coupled to receive a specific timing error correction word from said lookup table; and an adder coupled between said integer clock count register and said first comparator, wherein said adder adds said output bit of said shift register to an output of said integer clock count register.

13. The data capture circuit of claim 8, wherein said integer error compensation circuit comprises:

a lookup table configured to contain a plurality of timing error correction words;

a fractional count register coupled to control an output of said lookup table;

a shift register having an output bit and an parallel load port, wherein said parallel load port is coupled to receive a specific timing error correction word from said lookup table; and a subtracter coupled between said integer clock count register and said first comparator, wherein said subtracter subtracts said output bit of said shift register to an output of said integer clock count register.

14. The data capture circuit of claim 8, further comprising a divider coupled between said first comparator and said integer error compensation circuit.

15. The data capture circuit of claim 14, further comprising a second comparator coupled to said counter and said integer error compensation circuit.

16. The data capture circuit of claim 15, wherein said second comparator compares a counter output of said counter with a value from said integer error compensation circuit; and said second comparator resets said counter if said value from said integer error compensation circuit equals said counter output.

* * * * *